A. WANNER.
Velocipede.
No. 98,819.
2 Sheets—Sheet 1.
Patented Jan'y 11, 1870
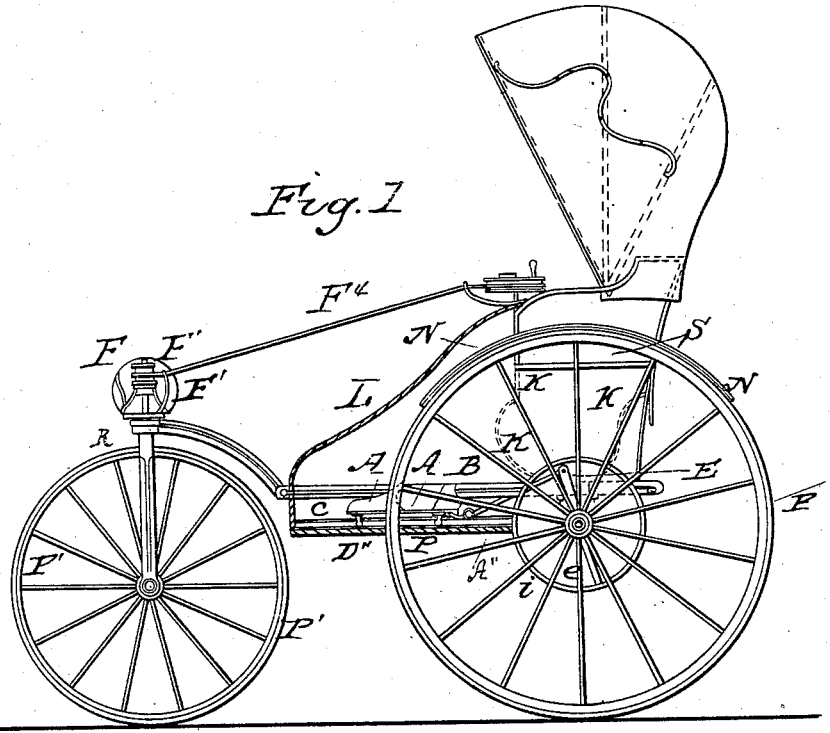
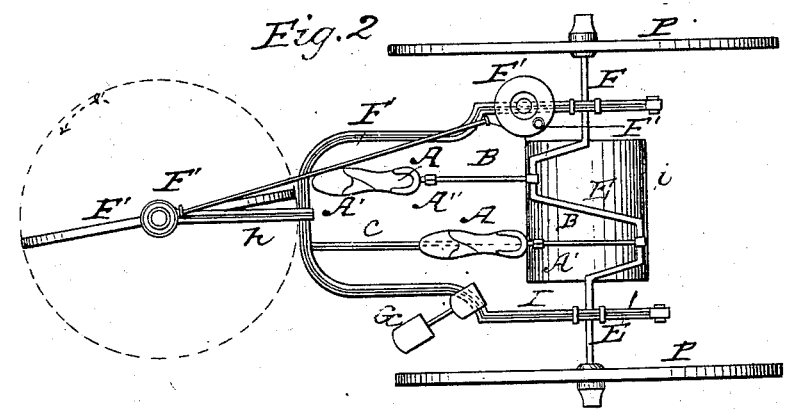

A. WANNER.
Velocipede.
No. 98,819.
2 Sheets—Sheet 2.
Patented Jan'y 11, 1870
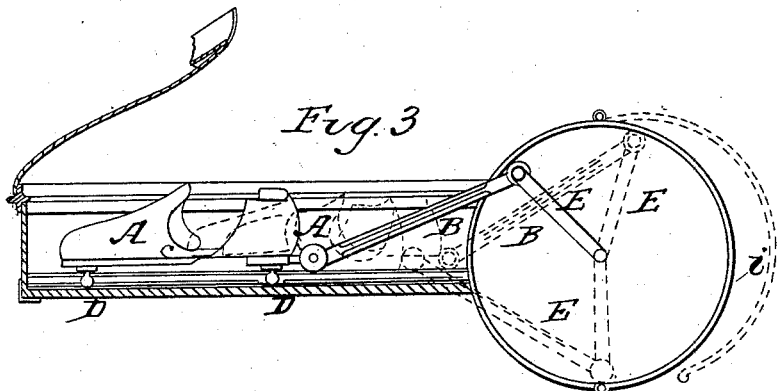
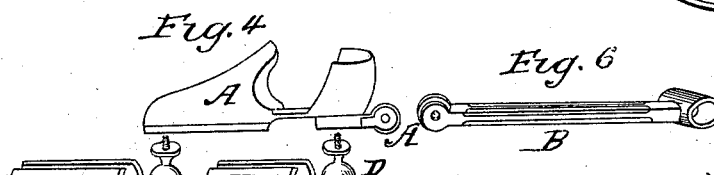
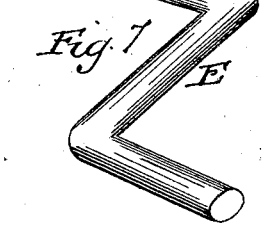
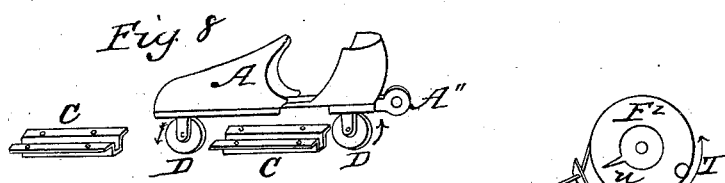
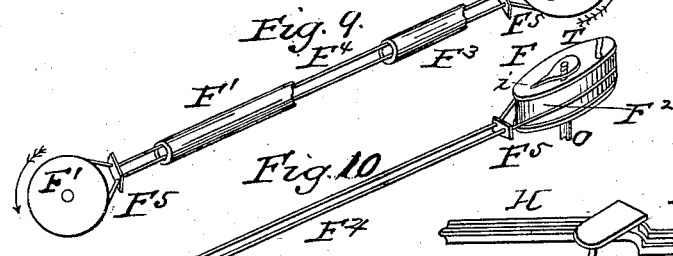
Witnesses
Inventor
Anthony Wanner
by
his Atty

United States Patent Office.

ANTHONY WANNER, OF NEW YORK, N. Y.

Letters Patent No. 98,819, dated January 11, 1870; antedated January 1, 1870.

---

IMPROVEMENT IN VELOCIPEDES.

---

The Schedule referred to in these Letters Patent and making part of the same.

---

*To all whom it may concern:*

Be it known that I, ANTHONY WANNER, of New York city, county of New York, and in the State of New York, have invented a new and useful Improvement in Velocipedes; and I do hereby declare the following to be a full, clear, and exact description of the same, reference being had to the accompanying drawings, making a part of this specification, in which—

Figure 1 is a side elevation.

Figure 2, a plan view.

Figure 3, a longitudinal vertical section.

Figure 4, a perspective view of the pedal or shoe.

Figure 5, a perspective view of the slotted cylindrical groove, in which the wheels or spherical-formed bodies attached to the bottom of the pedals or shoes, slide.

Figure 6, a perspective view of the connecting-link or bar.

Figure 7, a perspective view of part of the bent axle or crank.

Figure 8, perspective views of the pedal or shoe, and the rectangular slot in which the wheels attached to the bottom of the shoe traverse.

Figure 9, a perspective view of the guiding-pulleys and the cord or chain that connects them, also showing the guiding-needle.

Figure 10, perspective view of the guiding-pulleys and cord or chain that connects them.

Figure 11, perspective view of part of the frame, its journal-box, and suspension-steps.

Figure 12 represents a device for locking one of the pedals to the frame of the vehicle.

The same letters of reference, where employed in the different figures, denote identical parts.

The nature of my invention consists in constructing a three-wheeled velocipede, in such a manner that the rider may propel the vehicle by placing his feet in shoes or pedals working in horizontal grooves in the bottom plate of the velocipede. These shoes are attached by connecting-rods to a crank-formed axle, to which the two rear wheels are secured.

An easy and safe device for steering the vehicle is provided for, the seat is resting on springs, and to add to the comfort of the rider, the rear part of the velocipede is protected by a folding cover.

In front of the vehicle is an apron or cover, protecting the feet and legs, and to enable the rider to ascend and descend the vehicle with ease, suspension-steps are secured to the frame of the velocipede.

In order to prevent any person but the owner or privileged rider from using the vehicle, I provide a device by which one of the shoes or pedals may be locked to the frame of the vehicle. In such condition the rear wheels are prevented from revolving, and, consequently, the velocipede cannot be propelled.

To enable others to make and use my invention, I will proceed to describe its construction and operation.

A A are two pedals or shoes, in which the feet of the rider are placed.

On the soles of said shoes are fastenings, supporting two small wheels, D D, which fit into and traverse in the slotted rectangular-formed groove C, in the bottom plate of the vehicle.

Instead of wheels, spherically-formed rollers may be employed, and in such case, the groove in which they are intended to traverse, must consequently be cylindrical. (See fig. 5.)

The rollers D are screwed into or otherwise fastened to the sole of the shoes A A.

On the heel or back of the shoes are projections, A'', into which an aperture or eye is cut, for the purpose of receiving a hook or joint of the connecting-rod B, which connects the shoes with the bent axle or crank E.

The shape of the crank or axle E is shown in fig. 2, and the connecting-rods B will move in opposite directions when the crank or axle revolves.

When one shoe is pushed forward, the other shoe will be drawn backward, and *vice versa*, and the rods attached to the shoes will communicate the motion to the crank or axle on which the driving-wheels P P are keyed.

The rider occupies the seat S, which rests on two or more springs, K K, fastened at their lower ends to the frame of the vehicle or to the axle E.

The front or guide-wheel P' is a swivel-wheel of less diameter than the hind wheels, and the vertical arm R, extending above the periphery of the wheel, is provided with a pulley, $F^1$, and connected with pulley $F^2$, placed on a vertical shaft, O, secured to the seat S.

Figs. 9 and 10, sheet 2, represent perspective views of both pulleys, and the cord or chain that connects them.

At the upper face of the pulley $F^2$ is a vertical handle, T, by which the rider is enabled to turn both pulleys, and thereby steering the guide-wheel P.

If the cord or chain $F^4$ should become loose and out of working order, the least movement backward of the seat will pull them tight, and permit them to work both pulleys, F and $F^2$, and, consequently, controlling the guide-wheel P'.

To prevent the rider's clothes from being entangled in the cord or chain $F^4$, a leather or metallic tube, $F^3$, surrounds it, and a brace, $F^5$, may be employed for the purpose of increasing or lessening the strain on the pulleys $F^1$ and $F^2$.

On the upper face of the pulley $F^2$, a guiding-needle, $u$, may be employed, which will indicate the position of the guiding-wheel to the rider.

The bent axle or crank is surrounded by a cylindrical folding cover, I, which prevents the clothing of the rider from being entangled, and adds beauty to the vehicle.

In order to prevent everybody from making use of the velocipede, I have, in fig. 12, shown one of the shoes in a position close to the front part of the frame, of the velocipede.

At the toe of the shoe is a projection, $A'$, provided with an aperture wide enough to allow a lock, $U^1$, to be inserted.

A similar projection, $U^2$, is fastened to the frame, in such position that a lock may fasten the projections together.

When the shoe is prevented from sliding in the horizontal slot C, the crank E cannot revolve, and consequently, the vehicle cannot be propelled unless the lock is removed.

By this device, no person can use the velocipede unless he has the key which fits the lock.

Mud-keepers N may be attached to the vehicle, a little above the periphery of the driving-wheels.

Having thus described my invention,

What I claim, and desire to secure by Letters Patent, is—

1. The combination and arrangement of the crank or bent axle E, connecting-rods B, pedals or shoes A, wheels or rollers D, and the horizontal-sliding grooves C C, substantially as and for the purpose set forth.

2. The steering-device, consisting of pulleys $F^1$ and $F^2$, the vertical shafts O and R, cord or chain $F^4$, braces $F^5$, tube or cover $F^3$, and guiding-needle U, when constructed and arranged substantially as and for the purpose set forth.

3. The device for locking the pedal to the frame, and thereby preventing the vehicle from being propelled, substantially as described.

In testimony whereof, I have signed my name to this specification, in the presence of two subscribing witnesses.

ANTHONY WANNER.

Witnesses:
NIELS POULSON,
CHARLES GREENE.